United States Patent
Clay et al.

(10) Patent No.: US 12,093,009 B2
(45) Date of Patent: *Sep. 17, 2024

(54) ONBOARDING DISTRIBUTED CONTROL NODE USING SECONDARY CHANNEL

(71) Applicant: Yokogawa Electric Corporation, Tokyo (JP)

(72) Inventors: Patrick Clay, Frisco, TX (US); Vien Nguyen, Frisco, TX (US); David Emerson, Coppell, TX (US); Hidenori Sawahara, Spring, TX (US); Andrew Keller, Lewisville, TX (US); Joseph Malm, Plano, TX (US)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 782 days.

This patent is subject to a terminal disclaimer.

(21) Appl. No.: 17/211,445

(22) Filed: Mar. 24, 2021

(65) Prior Publication Data
US 2022/0308542 A1  Sep. 29, 2022

(51) Int. Cl.
G05B 19/042 (2006.01)
H04W 4/80 (2018.01)
H04W 76/10 (2018.01)

(52) U.S. Cl.
CPC ............ *G05B 19/0423* (2013.01); *G05B 2219/25174* (2013.01); *G05B 2219/25186* (2013.01); *H04W 4/80* (2018.02); *H04W 76/10* (2018.02)

(58) Field of Classification Search
None
See application file for complete search history.

(56) References Cited

U.S. PATENT DOCUMENTS

2004/0260405 A1  12/2004  Eddie et al.
2005/0154874 A1  7/2005  Koga
(Continued)

FOREIGN PATENT DOCUMENTS

DE  10245176 A1 *  4/2004  ......... G05B 19/0426
JP  20102967  1/2010
(Continued)

OTHER PUBLICATIONS

Japan Patent Office; Written Opinion of the International Searching Authority issued for Application No. PCT/IB2022/052721, 9 pages, dated Jun. 14, 2022.
(Continued)

*Primary Examiner* — Natisha D Cox
(74) *Attorney, Agent, or Firm* — Gray Ice Higdon

(57) ABSTRACT

Implementations are described herein for provisioning a device such as a DCN with configuration data for operation on a process automation network using an "out-of-band" communication channel. In various implementations, a temporary out-of-band communication channel may be established between a first and second DCNs. The out-of-band communication channel may be distinct from a process automation network through which the first DCN is to be communicatively coupled with other process automation nodes of a process automation system. Provisioning data may be transmitted from the second DCN to the first DCN over the temporary out-of-band communication channel. The provisioning data may include: information technology (IT) configuration data and operational technology (OT) configuration data. Subsequent to the transmitting, the temporary out-of-band communication channel may be closed.

16 Claims, 6 Drawing Sheets

(56) References Cited

U.S. PATENT DOCUMENTS

| | | | | |
|---|---|---|---|---|
| 2012/0236769 A1* | 9/2012 | Powell | ............... | G05B 19/0426 |
| | | | | 370/310 |
| 2013/0095847 A1* | 4/2013 | Powell | ................. | H04W 64/00 |
| | | | | 455/456.1 |
| 2016/0246273 A1* | 8/2016 | Takahashi | .......... | G05B 19/0426 |
| 2016/0323825 A1 | 11/2016 | Yamaji et al. | | |
| 2018/0150061 A1* | 5/2018 | Yang | .................. | G05B 19/0423 |
| 2018/0375842 A1* | 12/2018 | Aschauer | ............ | H04L 63/0227 |

FOREIGN PATENT DOCUMENTS

| | | |
|---|---|---|
| JP | 2011170581 | 9/2011 |
| JP | 201797526 | 6/2017 |
| WO | 2020162084 | 8/2020 |

OTHER PUBLICATIONS

"OFAF (Open Process Automation Forum): Glossary and Abbreviations". The Open Group, Version 2.0. Mar. 2020. 26 pages.

Nest Learning Thermostat Installation Guide. Nest Labs, Inc. 12 pages.

"Introduction to Redfish" www.dmtf.org. 20 pages. Dec. 2017.

\* cited by examiner

ONBOARDING DISTRIBUTED CONTROL NODE USING SECONDARY CHANNEL

BACKGROUND

A process automation system may include one or more process automation networks. A process automation network may be the primary communication channel over which devices—such as compute and/or input/output (I/O) devices that are referred to in some contexts as distributed control nodes (DCNs)—communicate with other nodes of the process automation system such as other DCNs, sensors, actuators, servers, central control rooms, etc. Process automation networks are typically implemented using communication technologies that are reliable, fast, and that have considerable bandwidth, such as Ethernet.

SUMMARY

In some process automation systems, the process automation network itself may be used to provision devices with configuration data needed to operate as part of the process automation system. However, this raises difficulties when a to-be-added device such as a DCN has not been configured with parameters necessary to join, receive, and/or transmit data over the process automation network. This issue is sometimes addressed by pre-configuring the to-be-added device to some known, static network configuration. However, this may require that a knowledgeable system integrator set up a separate sub-network to match to the static network configuration of the device, before setting the device to the preferred network configuration of the process automation network. Additionally, device configuration or application deployment/upgrade is performed as a manual process by a system integrator, which can lead to human error/mistakes.

Accordingly, implementations are described herein for provisioning a device such as a DCN with configuration data for operation on a process automation network using an "out-of-band" communication channel. More particularly, but not exclusively, techniques are described herein for establishing such an out-of-band communication channel between the to-be-provisioned device and another, previously-provisioned device associated with the process automation network, so that the previously-provisioned device can provide (e.g., clone) configuration data to the to-be-provisioned device. This previously-provisioned device may be, for instance, an old DCN that is being replaced, a DCN that is being reconfigured for another purpose, a DCN that is simulated in software, etc.

The out-of-band communication channel may be distinct from the process automation network that is used by devices such as DCNs to communicate with each other. In some implementations, the out-of-band communication channel may be established using technologies such as universal serial bus (USB), near-field communication (NFC), Bluetooth, an auxiliary Ethernet network (which could be switched to a redundancy network post-provisioning in some cases), etc. By provisioning devices with such an out-of-band communication channel, more device configuration can be performed automatically, with little or manual intervention. Moreover, the process automation network itself is not burdened with—or exposed to—data exchanged during provisioning of devices. Thus, techniques described herein reduce errors, decrease an amount of time, effort, and expertise required to onboard and/or replace devices such as DCNs, and may provide increased security for the process automation network.

In various implementations, a previously configured and/or fully-provisioned device such as a DCN (sometimes referred to herein as a "provisioning device") may provision (e.g., push) information technology (IT) and/or operational technology (OT) configuration data to an un-provisioned device such as a DCN (sometimes referred to herein as a "to-be-provisioned device") via the out-of-band communication channel. IT configuration data may enable a device such as a DCN to engage in network communication with other nodes over the process automation network. IT configuration data may include networking parameters such as an internet protocol (IP) address, domain name system (DNS) parameters and/or lookup tables, an IP subnet mask, etc. IT configuration data may also include non-OT-specific data associated with hardware or software of the device, such as updates to firmware or the operating system (OS), redundancy policies, security policies, etc. In general, IT configuration data may be used by a device such as a DCN to join and/or communicate over the process automation network.

OT configuration data, by contrast, may enable a device such as a DCN to cooperate with (e.g., exchange commands and/or sensor data with) one or more actuators or sensors on the process automation network to implement an at least partially automated process. OT configuration data for a DCN may include, among other things: process automation applications to be installed on and/or operated by a DCN; a range limit to be imposed on/by the DCN; a preferred unit of measurement to be used by the DCN; an update frequency to be implemented by the DCN; one or more analog-to-digital conversion parameters to be used by the DCN; information about (e.g., roles of) other nodes in the process automation system; one or more signal conditioning parameters to be used by the DCN; security credentials for operation in the process automation system; error correction parameters (e.g., error correction code techniques) to be used by the DCN; high availability configuration such as redundancy setup; etc.

In some implementations, a provisioning device may simply clone its IT and/or OT data to the to-be-provisioned device over the out-of-band communication channel. This enables the to-be-provisioned device to join and operate on the process automation network relatively quickly and seamlessly. Cloning of IT and/or OT information may be particularly effective and efficient where the provisioning device is being replaced by the to-be-provisioned device because once provisioned, the latter can simply usurp the role formerly played by the former (e.g., by using the same IP address). However, there may be circumstances where cloning IT/OT configuration data presents challenges. For example, if IT configuration data is cloned from the provisioning device to multiple different devices, those multiple different devices may have conflicting IP addresses. If OT configuration data is cloned from the provisioning device to multiple different devices, those multiple different devices may perform conflicting actions in the process automation system. Accordingly, in some implementations, after provisioning, the provisioning device may be transitioned into a disabled state in which it is prevented (at least without subsequent human intervention) from cloning IT/OT configuration data to any additional devices.

Cloning may also present challenges where the provisioning device will continue to operate as part of the process automation system. Accordingly, in some implementations, one or both of the provisioning and to-be-provisioned devices may take measures to avoid conflicts while allowing both to join and/or exchange data over the process automation network after the former provisions IT/OT configuration data to the latter. In some implementations, one of the two devices may not communicate over the process automation network it has received some sort of signal (e.g., over the out-of-band communication channel) that the other of the two devices has received a new IP address. For example, the newly-provisioned device may close the out-of-band communication channel once it receives a new IP address (e.g., different than the IP address it received from the provisioning device). When the provisioning device detects that the out-of-band communication channel has been closed, the provisioning device may rejoin the process automation network (which may or may not require physical reconnection) using the same IP address it used previously.

In some implementations, a method for provisioning a first DCN for operation as part of a process automation system may be implemented using one or more processors and may include: establishing a temporary out-of-band communication channel between the first DCN and a second DCN, wherein the temporary out-of-band communication channel is distinct from a process automation network through which the first DCN is to be communicatively coupled with other process automation nodes of the process automation system; transmitting provisioning data from the second DCN to the first DCN over the temporary out-of-band communication channel, wherein the provisioning data includes: information technology (IT) configuration data that is usable by the first DCN to join the process automation network, and operational technology (OT) configuration data that is usable by the first DCN to cooperate with one or more of the other process automation nodes of the process automation system to implement an at least partially automated process; and subsequent to the transmitting, closing the temporary out-of-band communication channel.

In various implementations, the IT configuration data may include one or more networking parameters used by the second DCN previously. In various implementations, the transmitting may include cloning one or both of the IT and OT configuration data from the second DCN to the first DCN. In various implementations, the method may include, subsequent to the cloning, transitioning the second DCN into a disabled state in which the second DCN is prevented from cloning IT or OT configuration data to any additional DCNs. In various implementations, the method may include, subsequent to the cloning, transitioning the first DCN into a locked state in which the first DCN will reject at least some subsequent provisioning data.

In various implementations, the second DCN may be simulated by a computing device. In various implementations, the method may include triggering a provisioning routine on the first DCN in response to the transmitting, wherein the provisioning routine automatically configures the first DCN based on the IT and OT configuration data. In various implementations, the provisioning routine may restart one or more networking services executed by the first DCN after the first DCN is configured based on the IT configuration data.

In various implementations, the temporary out-of-band communication channel may be a USB channel and the process automation network may be an Ethernet network. In various implementations, the temporary out-of-band communication channel may be a NFC or Bluetooth channel.

In various implementations, one of the first or second DCN may refrain from transmitting data on the process automation network until the other of the first or second DCN is assigned a new Internet Protocol (IP) address. In various implementations, the method may include exchanging, between the first and second DCNs via the temporary out-of-band communication channel, confirmatory data that the other of the first or second DCN has received the new IP address. In various implementations, the temporary out-of-band communication channel may be closed in response to the assignment of the new IP address.

In another aspect, a DCN may be configured to perform a method comprising: establishing a temporary out-of-band communication channel with a provisioning DCN, wherein the temporary out-of-band communication channel is distinct from a process automation network through which the DCN is to be communicatively coupled with other process automation nodes of a process automation system; receiving, from the provisioning DCN via the temporary out-of-band communication channel, IT configuration data and OT configuration data; based on the IT configuration data, joining the process automation network; and based on the OT configuration data, cooperating with one or more of the other process automation nodes of the process automation system to implement an at least partially automated process.

In addition, some implementations include one or more processors of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

As used herein, an "at least partially automated process" includes any process cooperatively implemented within a process automation system by multiple devices with little or no human intervention. One common example of an at least partially automated process is a process loop in which one or more actuators are operated automatically (without human intervention) based on output of one or more sensors. Some at least partially automated processes may be sub-processes of an overall process automation system workflow, such as a single process loop mentioned previously. Other at least partially automated processes may comprise all or a significant portion of an entire process automation system workflow. In some cases, the degree to which a process is automated may exist along a gradient, range, or scale of automation. Processes that are partially automated, but still require human intervention, may be at or near one end of the scale. Processes requiring less human intervention may approach the other end of the scale, which represents fully autonomous processes. Process automation in general may be used to automate processes in a variety of domains, e.g., manufacture, development, and/or refinement of chemicals (e.g., chemical processing), catalysts, machinery, etc.

Figure 1:
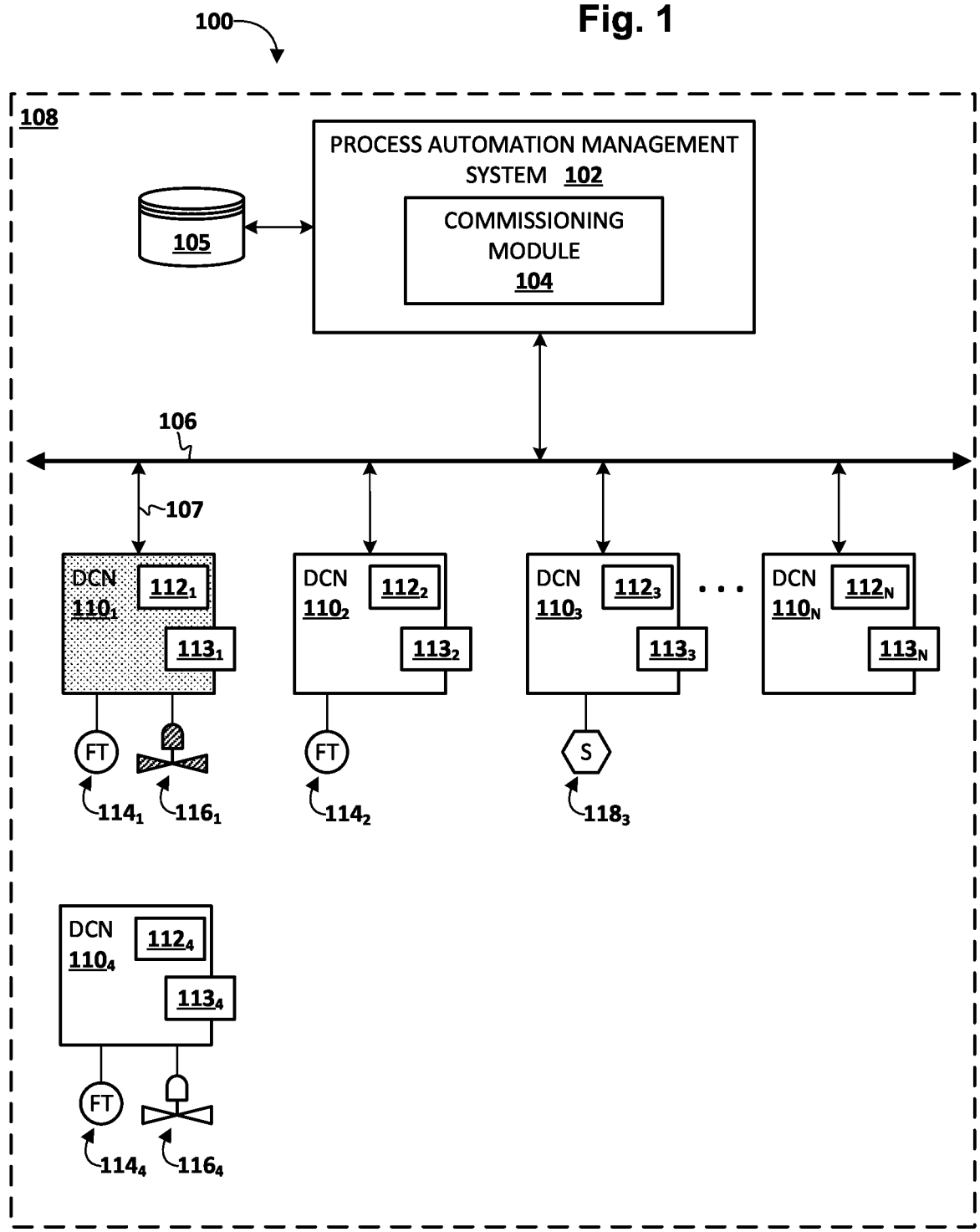
FIGS. 1 and 2 schematically depict how selected aspects of the present disclosure may be implemented in a particular scenario, in accordance with various embodiments.

Referring now to FIG. 1, an example environment 100 in which various aspects of the present disclosure may be implemented is depicted schematically. A process automation management system 102 is operably coupled with a process automation network 106 in a process automation facility 108. Process automation facility 108 (alternatively referred to herein as "process automation system 108") may take numerous forms and may be designed to implement any number of at least partially automated processes. For example, process automation facility 108 may form all or part of a chemical processing plant, an oil or natural gas refinery, a catalyst factory, a manufacturing facility, etc.

Process automation network 106 may be implemented using various wired and/or wireless communication technologies, including but not limited to the Institute of Electrical and Electronics Engineers (IEEE) 802.3 standard (Ethernet), IEEE 802.11 (Wi-Fi), cellular networks such as 3GPP Long Term Evolution ("LTE") or other wireless protocols that are designated as 3G, 4G, 5G, and beyond, and/or other types of communication networks of various types of topologies (e.g., mesh). Process automation is often employed in scenarios in which the cost of failure tends to be large, both in human safety and financial cost to stakeholders. Accordingly, in various implementations, process automation network 106 may be configured with redundancies and/or backups to provide high availability (HA) and/or high quality of service (QoS).

Process automation management system 102 may include a commissioning module 104 and a database 105 that stores information used by commissioning module 104 to commission new devices to process automation facility 108. Various aspects of process automation management system 102, such as commissioning module 104, may be implemented using any combination of hardware and software. In some implementations, process automation management system 102 may be implemented across multiple computer systems as part of what is often referred to as a "cloud infrastructure" or simply the "cloud." However, this is not required, and in FIG. 1, for instance, process automation management system 102 is implemented within process automation facility 108, e.g., in a single building or across a single campus of buildings or other industrial infrastructure. In such an implementation, process automation management system 102 may be implemented on one or more local computing systems, such as on one or more server computers.

In addition to process automation management system 102, a variety of other nodes/devices are operably coupled with process automation network 106. In FIG. 1, for instance, N (positive integer) DCNs $110_{1-N}$ are operably coupled with process automation network 106. Each DCN may include circuitry or logic 112 that may take various forms, such as processor(s) that execute instructions in memory, a field-programmable gate array (FPGA), an application-specific integrated circuit (ASIC), and so forth. Each DCN 110 may have a particular role to play in process automation facility 108. "Compute" DCNs, for instance, may control a process loop (e.g., a chemical process loop) in which various "field" devices (e.g., devices having sensors and/or actuators) interface with each other to perform some number of function control blocks (FBs).

Each DCN 110 may have various input/output (I/O) and other hardware components that dictate at least some of its OT capabilities and, more generally, its role at process automation facility 108. OT capabilities may vary widely among industries. In some cases, OT capabilities may include, but are not limited to, a count of I/O channels; one or more types of one or more I/O channels; a range limit; a nominal unit of measurement; a nominal update frequency; one or more analog-to-digital conversion parameters; one or more signal conditioning parameters; supported open standard protocols such as the Open Platform Communications (OPC) Unified Architecture (OPC UA) and/or Modbus; or any combination thereof.

In FIG. 1, first DCN $110_1$ includes a flow transmitter (FT) component $114_1$ and an actuator (e.g., a valve) $116_1$. Second DCN $110_2$ includes a FT component $114_2$ but no actuator. Third DCN $110_3$ includes a sensor $118_3$ but no actuator.

Actuators 116 may be any electric, hydraulic, mechanical, and/or pneumatic component that is controllable to affect some aspect of a process automation workflow that occurs at process automation facility 108. In many cases, an actuator 116 may perform its function in response to various signals, such as sensor signals or commands from compute DCNs (which themselves may monitor for sensor signals). Some non-limiting examples of actuators 116 include, but are not limited to, valves, pistons, rotors, switches, heaters, coolers, stirrers, injectors, devices to create vacuums, belts, tracks, gears, grippers, motors, relays, servomechanisms, etc. A sensor 118 may take various forms, including but not limited to a pressure sensor, a temperature sensor, a flow sensor (e.g., FT component 114), various types of proximity sensors, a light sensor (e.g., a photodiode), a pressure wave sensor (e.g., microphone), a humidity sensor (e.g., a humistor), a radiation dosimeter, a laser absorption spectrograph (e.g., a multi-pass optical cell), and so forth.

Unlike DCNs $110_{1-3}$, $DCN_N$ does not include any input/output (actuators or sensors). Instead, $DCN_N$ may be a "compute only" DCN whose role is to facilitate cooperation between itself and one or more other DCNs 110 on process automation network 106 to implement an at least partially automated process. For example, DCN $110_N$ may control a single process loop (e.g., a chemical process control loop) that involves one or more other DCNs 110. In some cases, such a compute DCN 110 may perform a role similar to an autopilot on an airplane—the compute DCN 110 may receive various signals and, based on those signals and various criteria and/or thresholds, control various actuators. For example, the compute DCN 110 may monitor various sensors 118 and/or FT components 114 to ascertain data about chemical levels, flow rates (e.g., across valves), tank temperatures, control rates, etc., and may control one or more actuators 116 based on these data and/or comparisons of these data to various criteria and/or thresholds. For instance, compute DCN $110_N$ can control actuator $116_1$ by transmitting, to DCN $116_1$, corresponding command(s) that can optionally conform to a protocol that is specific to DCN $116_1$.

As noted previously, adding DCNs to process automation network 106, whether as new additions, replacements, or upgrades, can be complicated and cumbersome, e.g., due to the commissioning process being performed at least in part by exchanging data over process automation network 106. Accordingly, improved techniques are described herein for provisioning a device such as a DCN 110 with IT and/or OT configuration data for operation on process automation network 106 using an "out-of-band" communication channel. A DCN 110 may be provisioned using techniques described herein under a variety of circumstances, such as expanding capabilities of process automation facility 108, replacing underperforming, malfunctioning, disabled, or obsolete nodes, repurposing nodes, bringing process automation facility 108 into conformance with various standards, etc.

Figure 2:
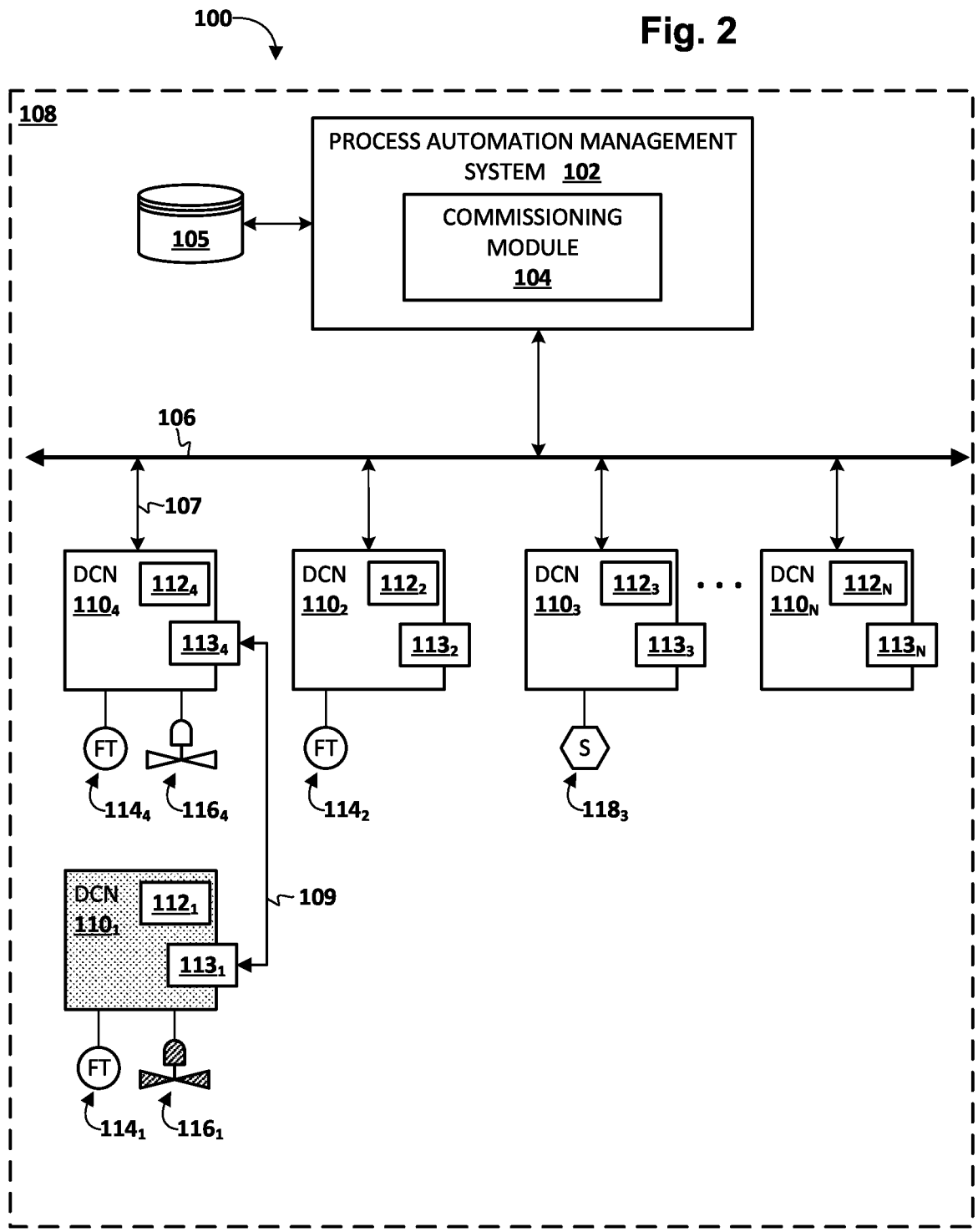

FIGS. 1 and 2 depict a scenario in which a DCN is replaced with another DCN. In FIG. 1, first DCN $110_1$ is shaded to indicate that it is to be replaced, e.g., because actuator $116_1$ is out-of-order. First DCN $110_1$ is being replaced with a fourth DCN $110_4$, which also includes both a FT component $114_4$ and an actuator $116_4$. In FIGS. 1 and 2, each DCN 110 includes a respective interface 113 that is usable to establish an out-of-band communication channel (not yet established in FIG. 1, indicated at 109 in FIG. 2) between the DCN 110 and another device, such as another DCN or a computing device that simulates another DCN. Interfaces $113_{1-N}$ may all support the same communication technology, or they may support varying communication technologies. For example, interface $113_1$ may facilitate USB communication and interface $113_2$ may facilitate NFC or Bluetooth communication.

The out-of-band communication channel 109 that is established between interfaces 113 of two DCNs 110 is distinct from process automation network 106. Out-of-band communication channel 109 may or may not be temporary. In scenarios in which process automation network 106 is implemented using Ethernet, a connection 107 between a DCN 110 and process automation network 106 may be a registered jack (RJ) 45 connection in some implementations. In many such cases, out-of-band communication channel 109 may be implemented using different communication technologies such as USB, NFC, Bluetooth, etc. However, in other implementations, out-of-band communication channel 109 may be implemented using the same type of communication technology (e.g., Ethernet) as process automation network 106, albeit as a separate network/subnet that is sandboxed from process automation network 106.

In FIG. 2, out-of-band communication channel 109 has been established between first interface $113_1$ of first DNC $110_1$ and fourth interface $113_4$ of its replacement, fourth DCN $110_4$. For example, first DCN $110_1$ may be small enough to be carried by a person, and therefore may be readily coupled physically with other nearby devices via interface $113_1$, such as with fourth DCN $110_4$. In FIG. 2, first DCN $110_1$ has been disconnected from process automation network 106 and fourth DCN $110_4$ has been connected to process automation network 106, but this is not required. In some implementations, techniques described herein may be implemented between two DCNs (or between other devices) without either being connected to process automation network 106.

First DCN $110_1$ may use out-of-band communication channel 109 to transmit (e.g., push) IT and/or OT configuration data to fourth DCN $110_4$. In the replacement scenario demonstrated in FIGS. 1-2, first DCN $110_1$ may clone its IT and/or OT configuration data to fourth DCN $110_4$, e.g., so that fourth DCN $110_4$ can usurp the role formerly served by first DCN $110_1$ in process automation facility 108. For example, fourth DCN $110_4$ may take over an IP address used formerly by first DCN $110_1$. Likewise, to the extent the OT capabilities of DCN $110_4$ correspond to and/or are compatible with those of first DCN $110_1$, first DCN $110_1$ may clone its OT configuration data to fourth DCN $110_4$ so that the latter can take over the role of the former with little-to-no disruption. In various implementations, out-of-band communication channel 109 may then be closed, e.g., logically using software and/or physically by disconnecting a cable connection between the two.

In a non-replacement scenario, by contrast, it may be the case that first DCN $110_1$ will continue to operate as part of process automation facility 108. In such a scenario, first DCN $110_1$ and/or fourth DCN $110_4$ may take various measures to avoid IT and/or OT conflicts moving forward—including but not limited to conflicts between network parameters such as IP addresses. For instance, neither of DCNs $110_1/110_4$ may transmit data over process automation network 106 until they are assigned different IP addresses, e.g., with first DCN $110_1$ retaining its original IP address and fourth DCN $110_4$ being assigned a new, available IP address. In some implementations, commissioning module 104 may determine and assign new IP addresses, e.g., based on table(s) of assigned and unassigned IP addresses stored in database 105. In various implementations, commissioning module 104 may determine/assign new IP addresses in response to various events, such as a request from one or both of DCNs $110_1/110_4$.

In some implementations, DCNs $110_1/110_4$ may exchange a signal to confirm assignment of a new IP address. For example, upon first DCN $110_1$ receiving a new, available IP address, it may close out-of-band communication channel 109. This closure may be a signal to fourth DCN $110_4$ that it is now able to rejoin and/or resume exchanging data over process automation network 106. As another example, the DCN that receives the new IP address may send a signal to the other DCN, e.g., over the out-of-band communication channel 109 or even over process automation network 106, so that the other DCN may rejoin and/or resume exchanging data over process automation network 106.

Figure 3:
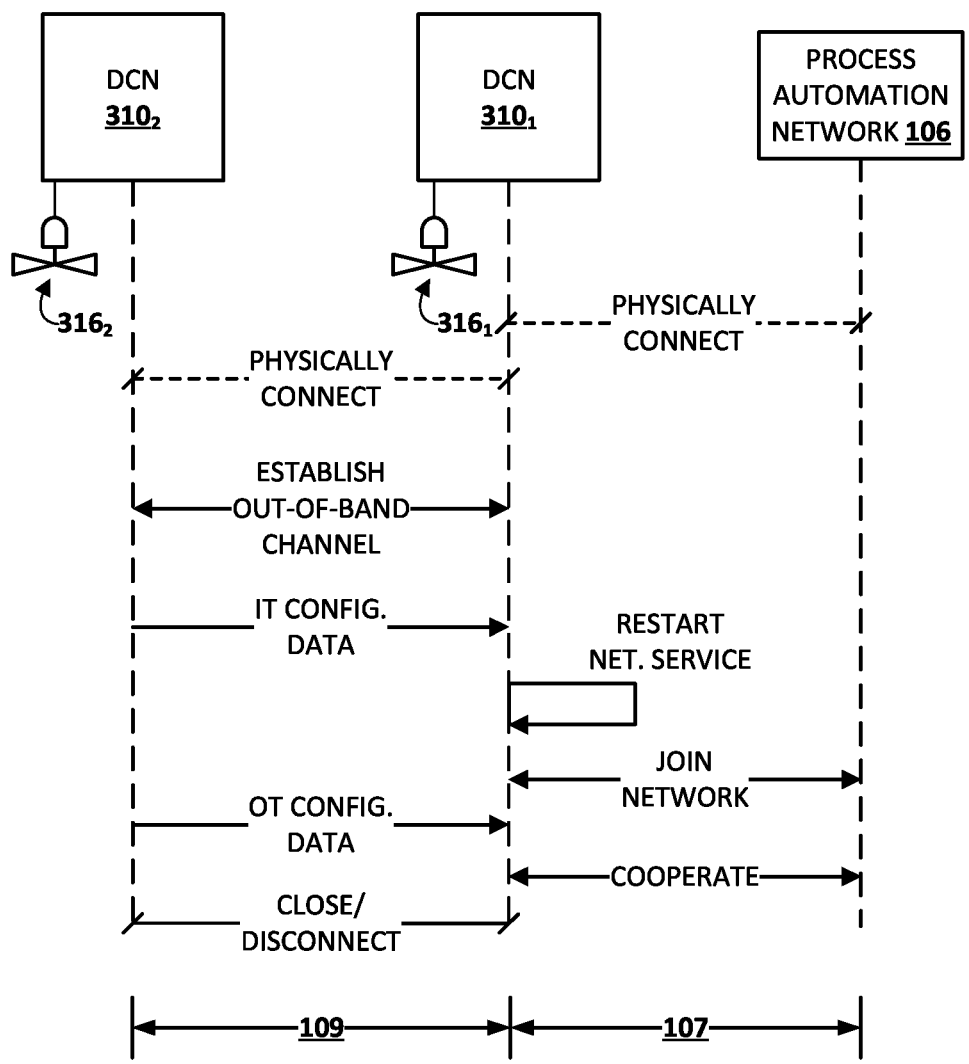
FIG. 3 schematically depicts another example of how techniques described herein may be implemented, in accordance with various embodiments.

Referring now to FIG. 3, an example process flow is depicted schematically between a to-be-provisioned DCNS $310_1$, a provisioning DCN $310_2$, and process automation network 106. In FIG. 3, time advances downward on the page. In some cases, the process may start with first DCN $310_1$ (which includes actuator $316_1$) being physically connected with process automation network 106, e.g., using RJ-45 connection 107, although this is not required. If such a physical connection is made, first DCN $310_1$ may be unable initially to join or exchange data over process automation network 106 because first DCN $310_1$ lacks proper network parameters. Meanwhile, in FIG. 3, second DCN $310_1$ with an actuator $316_2$ is physically connected to first DCN $310_1$ to establish out-of-band communication channel 109. As mentioned previously, out-of-band communication channel 109 may be implemented using either wired or wireless technology. Accordingly, in the wireless context, the physical connection depicted between DCNs $310_{1-2}$ in FIG. 3 may be omitted.

Second DCN $310_2$ then transmits/pushes IT configuration data to first DCN $310_1$ via out-of-band communication channel 109. This IT configuration data may be usable by first DCN $310_1$ to join process automation network 106. In various implementations, the IT configuration data may include networking parameters such as an IP address (e.g., the one formerly used by second DCN $310_2$) and/or a subnet mask, as well as other networking parameters and/or tools, such as a public encryption key, a certificate, time-sensitive networking parameters, domain name system (DNS) lookup tables, etc.

In various implementations, this pushing of IT configuration data may trigger a provisioning routine on first DCN $310_1$. In various implementations, the provisioning routine may be performed, e.g., by first DCN $310_1$, to automatically configure first DCN $310_1$ based on the IT configuration data. For example, first DCN $310_1$ may configure its network interface with an IP address and/or subnet mask. In some implementations, and as is depicted in FIG. 3, the provisioning routine may cause one or more networking services (e.g., TCP, UDP, IP, etc.) executed by first DCN $310_1$ to restart after the first DCN is configured based on the IT configuration data.

Once first DCN $310_1$ is configured with IT configuration data (and any applicable networking services are restarted), first DCN $310_1$ may be able join process automation network 106. Meanwhile, second DCN $310_2$ may push OT configuration data to first DCN $310_1$. The provisioning routine mentioned previously may also include first DCN $310_1$ making various adjustments (installations, parameter adjustments, etc.) based on the OT configuration data received from second DCN $310_2$ via out-of-band communication channel 109.

Subsequently, first DCN $310_1$ may cooperate with various other process automation nodes that are communicatively coupled with process automation network 106, e.g., by exchanging commands and/or sensor data with them over process automation network 106, to implement an at least partially automated process. Once first DCN $310_1$ is able to exchange data over process automation network 106, as shown in FIG. 3, first DCN $310_1$ or second DCN $310_2$ may close out-of-band communication channel 109, and/or DCNs $310_{1-2}$ may be physically decoupled from each other.

Figure 4:
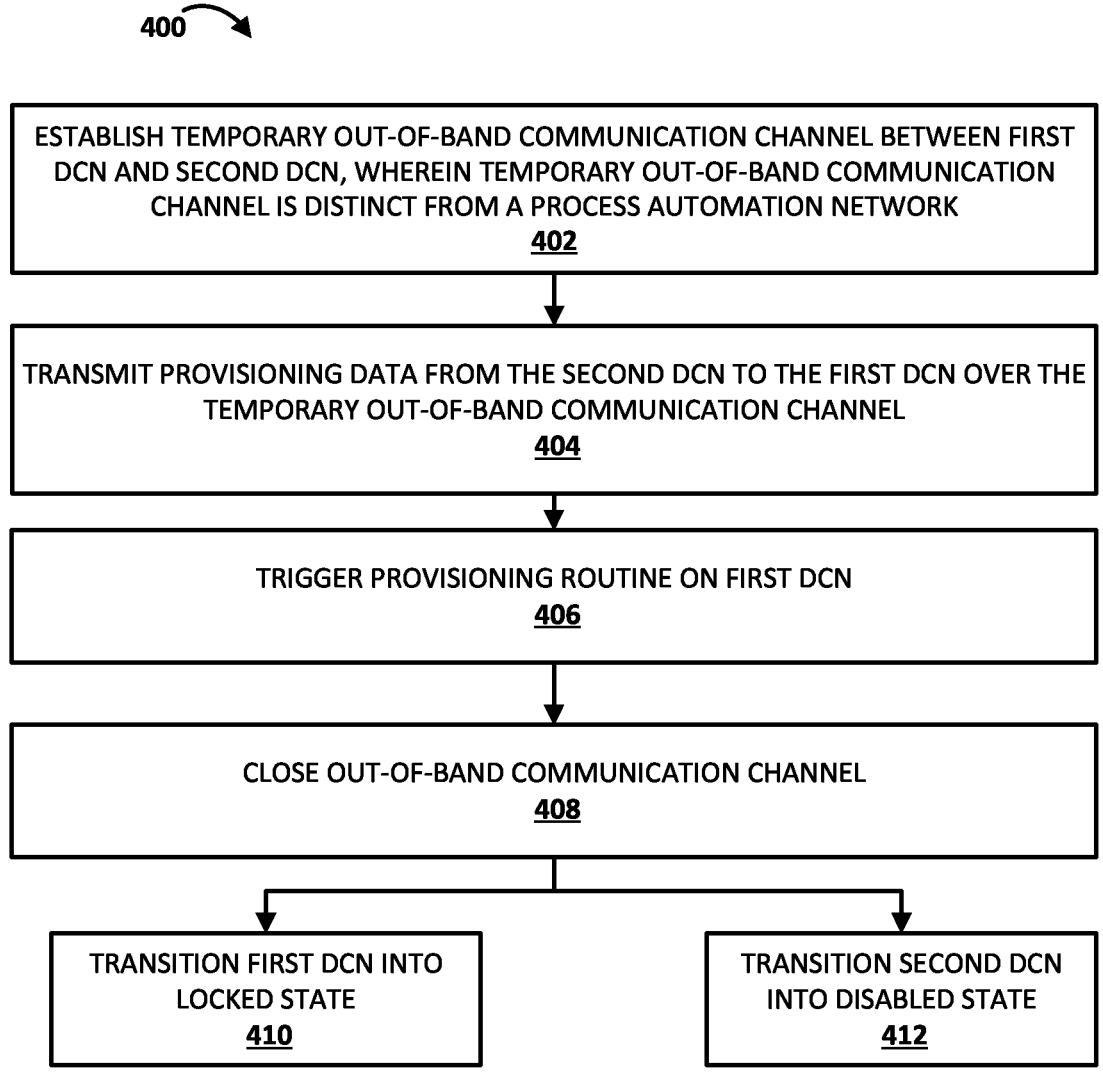
FIG. 4 illustrates an example method for performing selected aspects of the present disclosure.

FIG. 4 is a flowchart illustrating an example method 400 for provisioning a first DCN for operation as part of a process automation system, in accordance with implementations disclosed herein. For convenience, the operations of the flow chart are described with reference to a system that performs the operations. This system may include various components of various computer systems, such as one or more components of process automation management system 102, and/or other devices such as DCNs 110/310. Moreover, while operations of method 400 are shown in a particular order, this is not meant to be limiting. One or more operations may be reordered, omitted or added.

At block 402, the system may establish a temporary out-of-band communication channel (e.g., 109) between the first DCN and a second DCN. In various implementations, the temporary out-of-band communication channel may be distinct from a process automation network (e.g., 106) through which the first DCN is to be communicatively coupled with other process automation nodes of a process automation system (e.g., 108).

At block 404, the system, e.g., by way of the second DCN, may transmit provisioning data from the second DCN to the first DCN over the temporary out-of-band communication channel. In some implementations, this transmission may be a one-way transmission, although that is not required. In various implementations, this provisioning data may include IT configuration data that is usable by the first DCN to join the process automation network, and OT configuration data that is usable by the first DCN to cooperate with one or more of the other process automation nodes of the process automation system to implement an at least partially automated process.

At block 406, and in response to the transmission of block 404, the system may trigger a provisioning routine on the first DCN. This provisioning routine may perform a variety of different actions to prepare the first DCN to join the process automation network and to cooperate with other process automation nodes as part of a process automation system. For example, a file system and/or OS used by the first DCN may be detected and used to determine where particular IT and/or OT data should be stored. As another example, various networking and/or other services may be restarted so that parameters contained in the IT/OT configuration data are made active. In some implementations, particularly where the second DCN is simulated by a computer system, a display and/or other output of the computer system can be used to present data and/or a user interface that is operable to manually configure data where needed or beneficial.

Subsequent to the transmitting, at block 408, the out-of-band communication channel may be closed, e.g., by either the first or second DCN, or even manually by a technician. However, in other implementations and/or in particular scenarios, the out-of-band communication channel may be preserved for other purposes, such as redundancy, load balancing, etc., in which case block 408 may be omitted.

As noted previously, if both DCNs are going to continue to be used, then measures may be taken to avoid conflicts, particularly between networking parameters such as IP addresses. For example, at block 410, the first DCN may be transitioned into a locked state in which the first DCN will reject at least some subsequent provisioning data. This locked state may or may not be permanent. In some implementations, the locked state may prevent the first DCN from being accidently or maliciously overwritten, at least until an administrator has manually unlocked it. As another example, at block 412, the second DCN may be transitioned into a disabled state which the second DCN is prevented from exchanging data over the process automation network and/or in which the second DCN is prevented from cloning IT and/or OT configuration data to any additional DCNs. This may avoid potential conflicts and ensure that different people won't accidentally (or maliciously) use the same DCN to overwrite multiple other DCNs.

Figure 5:
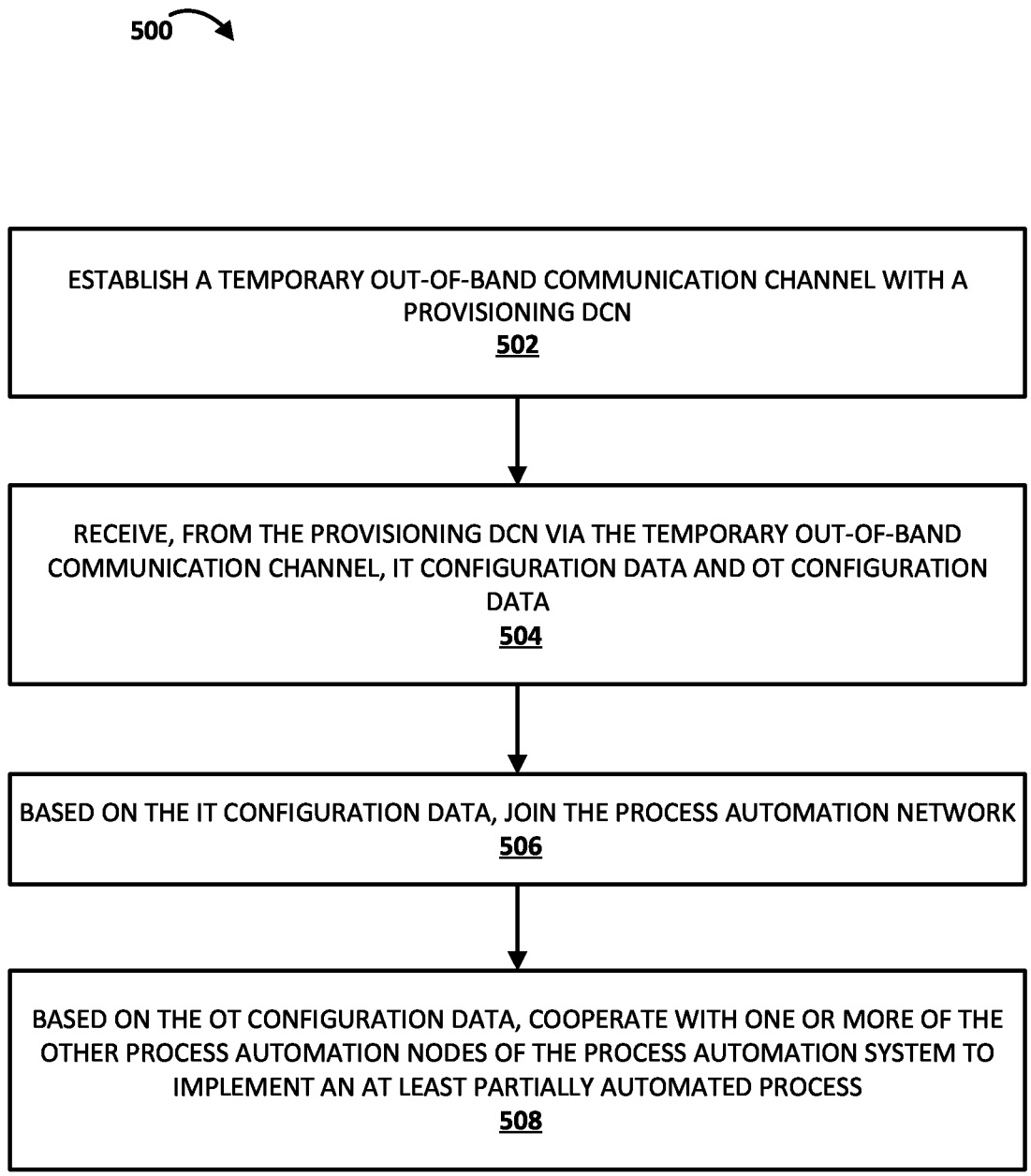
FIG. 5 illustrates another example method for performing selected aspects of the present disclosure.

FIG. 5 is a flowchart illustrating an example method 500 for a to-be-provisioned DCN 110/310 to practice selected aspects of the present disclosure, in accordance with implementations disclosed herein. While operations of method 500 are shown in a particular order, this is not meant to be limiting. One or more operations may be reordered, omitted or added.

At block 502, the DCN (e.g., $110_4$ in FIGS. 1-2, $310_1$ in FIG. 3) may establish a temporary out-of-band communication channel (e.g., 109) with a provisioning DCN (e.g., $110_1$ in FIGS. 1-2, $310_2$ in FIG. 3). As noted previously, the temporary out-of-band communication channel may be distinct from a process automation network (e.g., 106) through which the DCN is to be communicatively coupled with other process automation nodes of a process automation system (e.g., 108).

At block 504, the DCN 110/310 may receive, from the provisioning DCN via the temporary out-of-band communication channel, IT configuration data and OT configuration data. Based on the IT configuration data, at block 506, the DCN may join the process automation network. Based on the OT configuration data, the DCN may subsequently cooperate with one or more of the other process automation nodes of the process automation system to implement an at least partially automated process.

Figure 6:
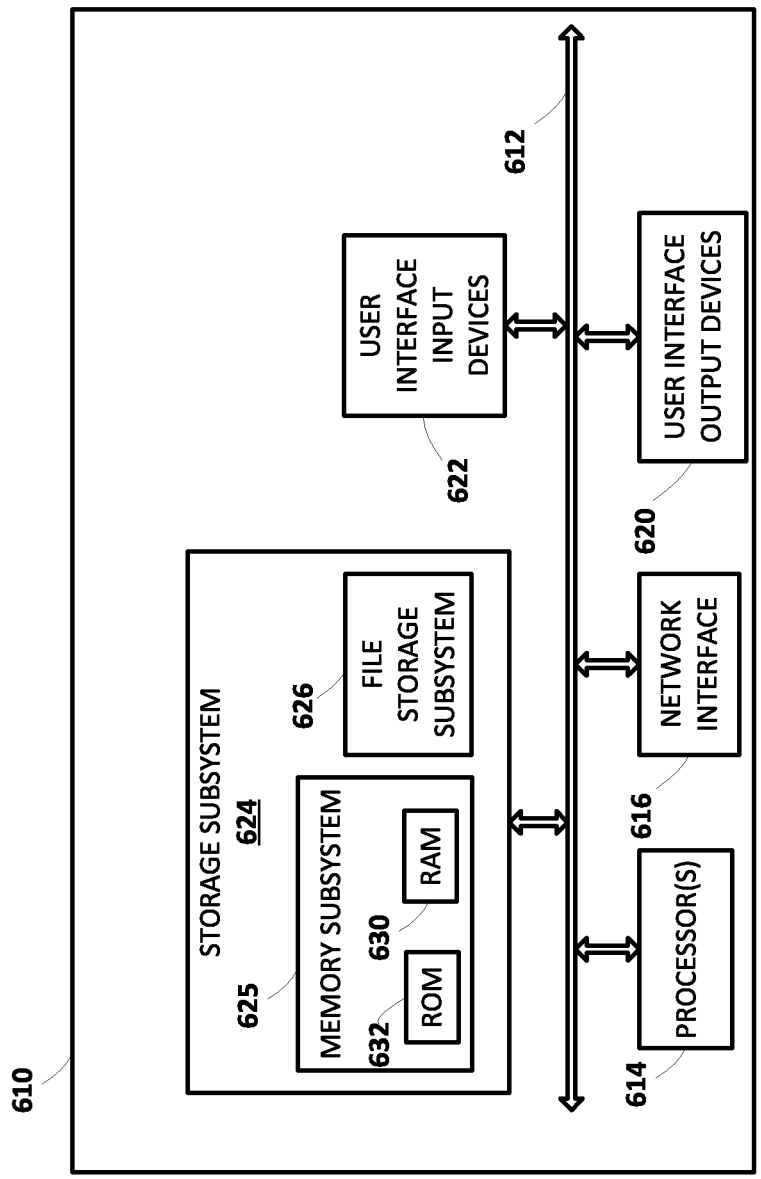
FIG. 6 schematically illustrates an example computer architecture on which selected aspects of the present disclosure may be implemented.

FIG. 6 is a block diagram of an example computing device 610 that may optionally be utilized to perform one or more aspects of techniques described herein. Computing device 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computing device 610. Network interface subsystem 616 provides an interface to outside networks and is coupled to corresponding interface devices in other computing devices.

User interface input devices 622 may include a keyboard, pointing devices such as a mouse, trackball, touchpad, or graphics tablet, a scanner, a touch screen incorporated into the display, audio input devices such as voice recognition systems, microphones, and/or other types of input devices. In general, use of the term "input device" is intended to include all possible types of devices and ways to input information into computing device 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 610 to the user or to another machine or computing device.

Storage subsystem 624 stores programming and data constructs that provide the functionality of some or all of the modules described herein. For example, the storage subsystem 624 may include the logic to perform selected aspects of the methods of FIGS. 4-5, as well as to implement various components depicted in FIGS. 1-3.

These software modules are generally executed by processor 614 alone or in combination with other processors. Memory 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computing device 610 communicate with each other as intended. Although bus subsystem 612 is shown schematically as a single bus, alternative implementations of the bus subsystem may use multiple busses.

Computing device 610 can be of varying types including a workstation, server, computing cluster, blade server, server farm, or any other data processing system or computing device. Due to the ever-changing nature of computers and networks, the description of computing device 610 depicted in FIG. 6 is intended only as a specific example for purposes of illustrating some implementations. Many other configurations of computing device 610 are possible having more or fewer components than the computing device depicted in FIG. 6.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method for provisioning a first distributed control node (DCN) for operation as part of a process automation system, the method implemented using one or more processors and comprising:
    establishing a temporary out-of-band communication channel between the first DCN and a second DCN, wherein the temporary out-of-band communication channel is distinct from a process automation network through which the first DCN is to be communicatively coupled with other process automation nodes of the process automation system;
    transmitting provisioning data from the second DCN to the first DCN over the temporary out-of-band communication channel, wherein the provisioning data includes:
    information technology (IT) configuration data that is usable by the first DCN to join the process automation network, and
    operational technology (OT) configuration data that is usable by the first DCN to cooperate with one or more of the other process automation nodes of the process automation system to implement an at least partially automated process; and
    subsequent to the transmitting, closing the temporary out-of-band communication channel, wherein the transmitting includes cloning one or both of the IT and OT configuration data from the second DCN to the first DCN, and
    in response to the cloning, transitioning the second DCN into a disabled state in which the second DCN is prevented from cloning IT or OT configuration data to any additional DCNs.

2. The method of claim 1, wherein the IT configuration data includes one or more networking parameters used by the second DCN previously.

3. The method of claim 1, further comprising, subsequent to the cloning, transitioning the first DCN into a locked state in which the first DCN will reject at least some subsequent provisioning data.

4. The method of claim 1, wherein the second DCN is simulated by a computing device.

5. The method of claim 1, further comprising triggering a provisioning routine on the first DCN in response to the transmitting, wherein the provisioning routine automatically configures the first DCN based on the IT and OT configuration data.

6. The method of claim 5, wherein the provisioning routine restarts one or more networking services executed by the first DCN after the first DCN is configured based on the IT configuration data.

7. The method of claim 1, wherein the temporary out-of-band communication channel comprises a universal serial bus (USB) channel and the process automation network comprises an Ethernet network.

8. The method of claim 1, wherein the temporary out-of-band communication channel comprises a near field communication (NFC) or Bluetooth channel.

9. The method of claim 1, wherein one of the first or second DCN refrains from transmitting data on the process automation network until the other of the first or second DCN is assigned a new Internet Protocol (IP) address.

10. The method of claim 9, further comprising exchanging, between the first and second DCNs via the temporary out-of-band communication channel, confirmatory data that the other of the first or second DCN has received the new IP address.

11. The method of claim 9, wherein the temporary out-of-band communication channel is closed in response to the assignment of the new IP address.

12. A distributed control node (DCN) comprising circuitry to:
establish a temporary out-of-band communication channel with a provisioning DCN, wherein the temporary out-of-band communication channel is distinct from a process automation network through which the DCN is to be communicatively coupled with other process automation nodes of a process automation system;
receive, from the provisioning DCN via the temporary out-of-band communication channel, information technology (IT) configuration data and operational technology (OT) configuration data;
clone one or both of the IT and OT configuration data received from the provisioning DCN;
in response to the cloning, transition the DCN into a locked state in which the DCN will reject at least some subsequent provisioning data;
based on the IT configuration data, join the process automation network; and
based on the OT configuration data, cooperate with one or more of the other process automation nodes of the process automation system to implement an at least partially automated process.

13. The DCN of claim 12, wherein the IT configuration data includes one or more networking parameters used by the provisioning DCN previously.

14. The DCN of claim 12, further comprising instructions to trigger a provisioning routine on the DCN in response to receipt the IT and OT configuration data, wherein the provisioning routine automatically configures the DCN based on the IT and OT configuration data.

15. The DCN of claim 14, wherein the provisioning routine restarts one or more networking services executed by the DCN after the DCN is configured based on the IT configuration data.

16. At least one non-transitory computer-readable medium for provisioning a first distributed control node (DCN) for operation as part of a process automation system, the medium comprising instructions that, on execution by one or more processors, cause the one or more processors to:
establish a temporary out-of-band communication channel between the first DCN and a second DCN, wherein the temporary out-of-band communication channel is distinct from a process automation network through which the first DCN is to be communicatively coupled with other process automation nodes of the process automation system;
transmit provisioning data from the second DCN to the first DCN over the temporary out-of-band communication channel, wherein the provisioning data includes:
information technology (IT) configuration data that is usable by the first DCN to join the process automation network, and
operational technology (OT) configuration data that is usable by the first DCN to cooperate with one or more of the other process automation nodes of the process automation system to implement an at least partially automated process; and
subsequent to the transmission of the provisioning data, close the temporary out-of-band communication channel, wherein transmission of the provisioning data includes cloning one or both of the IT and OT configuration data from the second DCN to the first DCN, and
in response to the cloning, transition the second DCN into a new state in which the second DCN is prevented from cloning IT or OT configuration data to any additional DCNs.

* * * * *